UNITED STATES PATENT OFFICE.

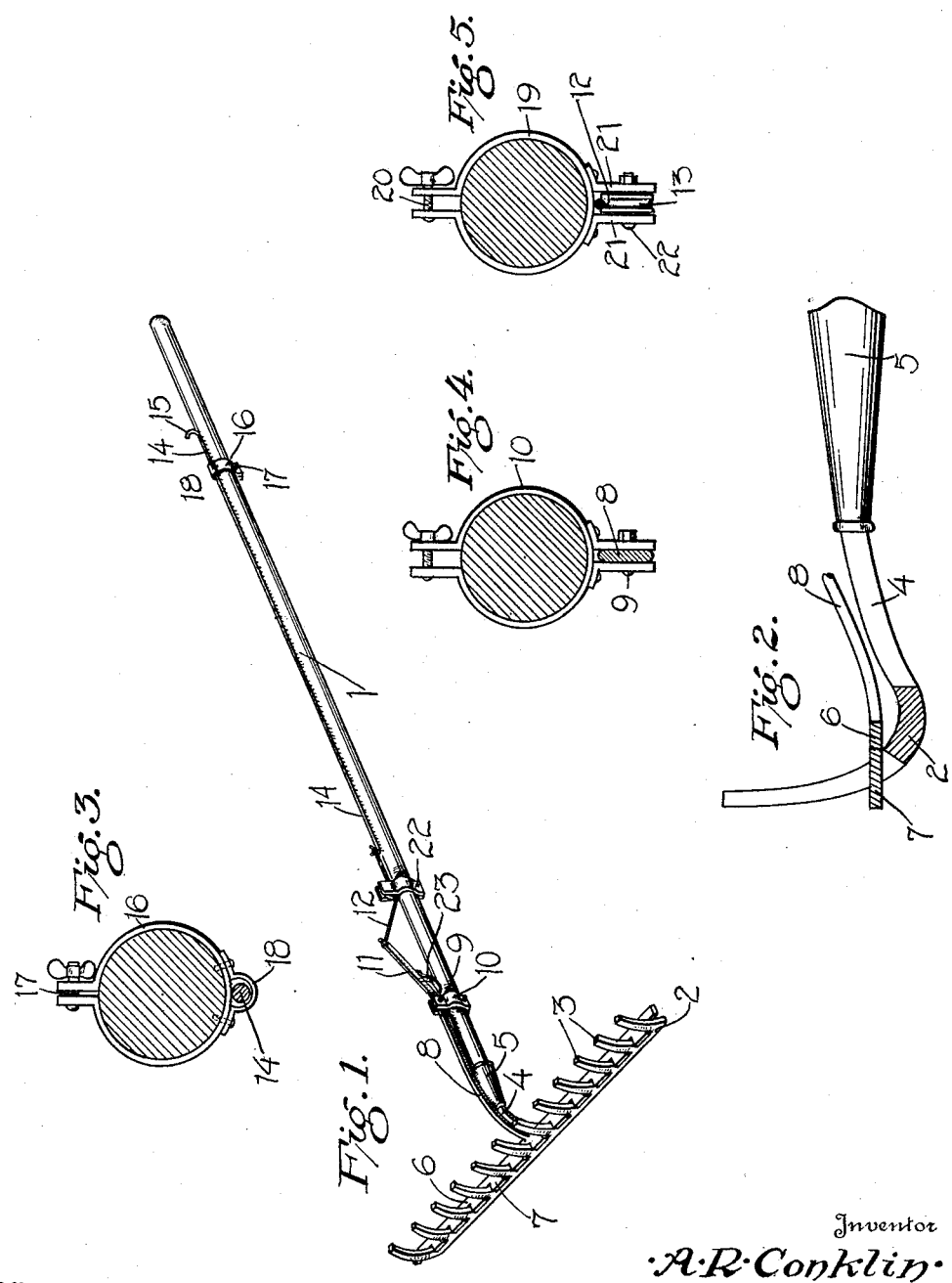

ALFRED R. CONKLIN, OF NEW YORK, N. Y.

RAKE.

1,113,412.	Specification of Letters Patent.	Patented Oct. 13, 1914.

Application filed November 19, 1913. Serial No. 801,946.

*To all whom it may concern:*

Be it known that I, ALFRED R. CONKLIN, a citizen of the United States, residing at New York city, in the county of New York and State of New York, have invented certain new and useful Improvements in Rakes; and I do hereby declare the following to be a full, clear, and exact description of the invention, such as will enable others skilled in the art to which it appertains to make and use the same.

This invention relates to new and useful improvements in self cleaning rakes and has for its object the provision of a device of the above character which is adapted for use on all kinds of rakes without the necessity of changing the construction thereof.

Another object of the invention is the provision of an attachment which will effectively strip the teeth of a rake of any trash which may have gathered thereon in a simple and effective manner without necessitating the user using his hands for that purpose.

A further object of the invention is the provision of a novel means for stripping the rake teeth of any undesirable matter and controlling the stripping mechanism from the handle of the rake.

With these and other objects in view I will now proceed to describe my invention in the following specification and accompanying drawings, in which, Figure 1 is a perspective view of a rake showing the improved attachment applied thereto, said rake being in an inverted position, Fig. 2 is an enlarged detail view of the rake head and attaching means therefor showing the head portion thereof and the stripping bar partly in section, Fig. 3 is a detail sectional view of the handle showing one of the clamps by means of which the sliding member is held in place, Fig. 4 is a detail view of the pivotal connection by means of which the stripping bar is secured to the handle, and Fig. 5 is an enlarged detail view of the clamp showing the pulley over which the flexible member for operating the stripping bar is adapted to pass when the device is in use.

Referring to the drawings by characters of reference 1 indicates the handle of an ordinary rake to which the head 2 is adapted to be secured. This head 2 is provided with the usual teeth 3 and a suitable angular extension 4, the free end of which terminates in a sleeve 5, which in turn is adapted to receive the end of the handle 1 and thereby form a connection for the handle with the rake head. This improved cleaning device which preferably comprises a suitable stripping bar 6, having the lateral extensions 7 formed thereon, which are adapted to extend between the rake teeth and force the trash off the ends thereof, is provided with the rearwardly extending arm 8 which is pivotally secured, as shown at 9, to the sleeve 10. This extension 8 is preferably provided at its rearmost terminal with the angular projection 11 to which the flexible member 12 is adapted to be secured.

The free end of the flexible member 12 is extended beneath the pulley 13 which will be more fully hereinafter described and secured to the longitudinally extending slidable bar 14. This bar 14 extends longitudinally with relation to the handle of the rake and terminates at its upper extremity in the hook member 15 upon which the operator exerts pull when the device is in use. A suitable clamp 16 is held securely in place on the handle by means of the bolt 17 and is provided with the eyelet 18 through which the bar 14 extends when the device is in use.

In Fig. 5, as shown, the form of clamp, which is used in connection with the flexible member 12, comprises the body portion 19, which is secured to the rake handle and held rigidly thereon by means of the bolt 20. This body portion 19 is provided with the depending ears 21, which are formed at a point diametrically opposed to the securing means. Each of the ears 21 is provided with a transversely extending aperture through which the bolt 22 extends. This bolt 22 is adapted to form the mounting upon which the pulley wheel 13 is rotatably mounted.

It will be clearly seen upon referring to the drawing and from the foregoing description, that the rake in its assembled position is held in operative relation by means of the spring 23 which is secured to the angular projection 11 and bears against the handle 1, thus holding the angular projection normally away from the handle and forcing the stripping bar 6 upwardly and against the head of the rake. It will be further apparent that when the user of the rake desires to strip the rake of any trash or other material which may have gathered thereon the slidable member 14 is pulled toward the end of the rake handle and through the action of the flexible member, pulling against the projection 11 it will be apparent that the stripping bar will be forced toward the ends of the rake teeth thus causing the foreign substance to be forced from the ends of the teeth and leaving the same free for further use. Owing to the action of the spring it will be evident that the stripping bar will be returned to its normal position as soon as the pull upon the end of the sliding member 14 is removed and the rake will again assume its normal position for operation.

While in the foregoing I have shown and described the preferred embodiment of the invention I wish it to be understood that I may make such changes in the combination and arrangement of parts as may fall within the spirit and scope of the invention as defined in the appended claim.

What I claim is:—

In combination with a rake comprising a handle, a head and teeth, a clamp secured near the forward end of the rake, a stripping bar, projections formed on the stripping bar and extending between the teeth of the rake head, an extension formed on the opposite side of the stripping bar, and pivotally connected to the clamp, an angular projection formed integral with the rear end of the extension, means to normally hold the angular extension away from the rake handle, a flexible member secured to the free end of the angular projection, a clamp secured to the rake handle intermediate its ends, a pulley mounted in said clamp, the flexible member being passed beneath the pulley and extending partly up the rake handle, and a member slidably mounted on the rake handle and connected to the free end of the flexible member, whereby when pull is exerted on the last mentioned member the stripping bar will be operated.

In testimony whereof I affix my signature in presence of two witnesses.

ALFRED R. CONKLIN.

Witnesses:
 Roscoe Conklin,
 William H. Bard.

---

Copies of this patent may be obtained for five cents each, by addressing the "Commissioner of Patents, Washington, D. C."